(12) United States Patent
Scheuer et al.

(10) Patent No.: US 7,065,276 B2
(45) Date of Patent: Jun. 20, 2006

(54) INTEGRATED OPTICAL FILTERS UTILIZING RESONATORS

(75) Inventors: Jacob Scheuer, Petach Tikva (IL); Moti Margalit, Zichron Yaaqov (IL); Daphna Bortman-Arbiv, Zichron Yaaqov (IL)

(73) Assignee: Lambda Crossing Ltd., Caesaria (IL)

( * ) Notice: Subject to any disclaimer, the term of this patent is extended or adjusted under 35 U.S.C. 154(b) by 0 days.

(21) Appl. No.: 10/406,794

(22) Filed: Apr. 3, 2003

(65) Prior Publication Data

US 2004/0202430 A1    Oct. 14, 2004

(51) Int. Cl.
*G02B 6/26* (2006.01)
*G02B 6/293* (2006.01)

(52) U.S. Cl. .......................... 385/50; 385/51
(58) Field of Classification Search .................. 385/50, 385/51
See application file for complete search history.

(56) References Cited

U.S. PATENT DOCUMENTS

| | | | |
|---|---|---|---|
| 4,720,160 A * | 1/1988 | Hicks, Jr. ..................... | 385/31 |
| 6,393,185 B1 * | 5/2002 | Deacon ........................ | 385/50 |
| 6,393,186 B1 * | 5/2002 | Deacon ........................ | 385/50 |
| 6,580,851 B1 * | 6/2003 | Vahala et al. ................. | 385/30 |
| 6,643,421 B1 * | 11/2003 | Chin et al. .................... | 385/15 |
| 6,751,368 B1 * | 6/2004 | Lim et al. ..................... | 385/14 |
| 6,762,869 B1 * | 7/2004 | Maleki et al. ............... | 359/239 |
| 6,819,837 B1 * | 11/2004 | Li et al. ........................ | 385/39 |
| 2002/0181829 A1 | 12/2002 | Margalit et al. | |

FOREIGN PATENT DOCUMENTS

| | | |
|---|---|---|
| WO | 00/72065 | 11/2000 |
| WO | 01/22139 | 3/2001 |
| WO | 01/27692 | 4/2001 |
| WO | 02/082140 | 10/2002 |

OTHER PUBLICATIONS

Little, B.E., et al. "Microring Resonator Channel Dropping Filters." Journal of Lightwave Technology, vol. 15, No. 6 (1997) pp. 998-1005.
Suzuki, S. "Integrated-Optic Double-Ring Resonators with a Wide Free Spectral Range of 100 Ghz.." Journal of Lightwave Technology, vol. 13, No. 8 (1995) pp. 1766-1771.
Gerasimchuk, et al., "Optical filters for systems with wavelength division-multiplexing" Transparent Optical Networks,.(2000) $2^{nd}$ Int'l Conference on Gdansk, Poland (2000) pp. 99-101.
Chin, M.K., et al., "Gaas Microcavity Channel-Dropping Filter based on a Race-Track Resonator" IEEE Photonics Technology Letters, IEEE Inc., New York, US, vol. 11, No. 12, (Dec. 1999), pp. 1620-1622.
Soref, R.A., et al., "Proposed N-Wavelength M-Fiber WDM Crossconnect Switch Using Active Microring Resonators" IEEE Photonics Technology Letters, IEEE Inc., New York, US, vol. 10, No. 8, (Aug. 1998), pp. 1121-1123.

* cited by examiner

*Primary Examiner*—Jack I. Berman
(74) *Attorney, Agent, or Firm*—Ladas & Parry

(57) ABSTRACT

A filtering method and optical filter structure are presented. The structure comprises an input waveguide, an output waveguide, and a filter stage formed by at least one closed loop resonator optically coupled to the input and output waveguides. A level of the coupling from each of the waveguides to the resonator is at least 5 times greater than a loss-per-revolution of the resonator. The filter structure thus provides for reducing a bandwidth and insertion loss while filtering at least one optical channel from a multi-channel light signal.

4 Claims, 12 Drawing Sheets

Fabri-Perot Resonator

Ring Resonator

Frequency Shift [GHz]

INTEGRATED OPTICAL FILTERS UTILIZING RESONATORS

FIELD OF THE INVENTION

The present invention is generally in the field of optical devices and relates to a filtering device and method, utilizing optical resonators.

BACKGROUND OF THE INVENTION

Optical filters play an important role in wavelength division multiplexing (WDM) communication systems. WDM systems achieve high bandwidth transmission by combining multiple optical channels, each of a different wavelength range, in an optical fiber. A filter is utilized to extract a specific optical channel from a multi-channel signal at a receiver side, and can be either fixed to a given wavelength range or tunable across a range of wavelengths.

Integrated optics provides for a compact method to realize an optical filter, and especially a tunable optical filter. One method of realizing filters in integrated optics technology is to combine multiple optical resonators [B. E. Little et al, "Microning Resonator Channel Dropping Filters", IEEE J. Lightwave Tech. 15, 998–1005 (1997)].

Generally, a tunable filter is characterized by such key parameters as bandwidth, insertion loss, attenuation (rejection) of out of band signal, free spectral range (FSR), and turning range.

An important feature, characterizing all optical resonators and resonator based devices, is the periodicity of their spectral response, i.e., the spectral response repeats itself with a period known as the Free Spectral Range (FSR). FIG. 1A illustrates the spectral response (transfer function) of a resonator coupled to input and output ports The FSR of such a device is the spectral spacing between the peaks of the transfer function. In optics, such a device can be realized, for example by a Fabry-Perot (FP) resonator comprised of a pair of partially reflecting mirrors (FIG. 1B), or by a ring resonator coupled to two waveguides which serve as input/output ports (FIG. 1C). The geometrical structure and constituent materials of the resonator device determine the total roundtrip delay of the device, which is the inverse of the FSR.

A resonator is characterized by such parameters as FSR, loss per roundtrip and coupling to input/output ports. The FSR indicates the spectral period of the resonator, and the coupling indicates the fraction of the light intensity in the input/output ports that is coupled into the resonator (and vice versa). All these parameters affect the filter profile. For example, a filter bandwidth can be narrowed by (1) decreasing the coupling, or (2) by decreasing the FSR (increasing the resonator roundtrip) and keeping tie coupling level constant. Decreasing the coupling also results in an increase of the out of band signal attenuation and the input to filtered output ratio (insertion loss) of the filter.

Generally, the requirements for filters in optical communications involve a narrow bandwidth and a wide FSR. Therefore, the known resonator based filters (e.g., WO 00/72065) were designed accordingly (i.e., large FSR and small coupling in order to achieve narrow bandwidth). In principal, this design approach exhibits superior filter performance. However, when accounting for the resonators' loss per roundtrip, the situation becomes more complex since for ring resonators, a large FSR implies small radii, which in turn implies higher radiation related losses. Hence, it is clear that not every filter shape or FSR may be achieved within a given loss budget.

SUMMARY OF THE INVENTION

There is accordingly a need in the art to facilitate filtering of one or more optical channels from a multi-channel light signal by providing a novel resonator based filter method and structure that provides for simultaneously achieving narrow bandwidth and low insertion loss of the filtering process.

The main idea of the present invention is associated with the following: The input to output insertion loss of a resonator filter is determined by the resonator loss per roundtrip and by the coupling coefficient. Generally, the insertion loss decreases as the coupling is increased. The filter bandwidth depends primarily on the coupling coefficient and the FSR. Narrowing the bandwidth is possible by decreasing either the coupling coefficient or the FSR. However, the FSR of the resonator is required to be as large as possible, or at least as large as the spectral band in which the filter is operating. The demand for a large FSR leads to a small roundtrip resonator. For a ring or closed loop resonator, a small roundtrip requires a small curvature of the resonator, which in turn introduces large radiation losses and, hence, high loss per roundtrip. In order to realize a narrow bandwidth filter structure using a large FSR resonator, a small coupling coefficient is needed. Accordingly, the insertion loss of such a filter structure would be high due to both the inherent high loss of the resonator and the required small coupling.

The present invention solves the high insertion loss problem of a narrow band filter structure by optically coupling at least one small-FSR closed loop resonator to input/output waveguides with high coupling coefficients, namely, with the coupling level at least 5 times higher than the loss-per-revolution of the resonator. For example, the construction may be such that a waveguide with a 0.5×1.4 μm core and a refractive index of about 2 is used being surrounded by a medium with a refractive index of 1.5 and coupled to a ring resonator with a coupling gap of about 1 μm, such that the interaction region of about 50 μm between the waveguide and ring resonator provides a 20% coupling. A ring resonator with no more than 4% loss satisfies this requirement.

The small FSR problem can be solved by utilizing several resonators with different FSRs (Vernier effect). Such an approach is disclosed in "Integrated-Optic Double-Ring Resonators with a Wide Free Spectral Range of 100 GHz", Senichi Suzuki et al., Journal of Lightwave Technology, Vol. 13, pp. 1766–1771(1995).

The implementation of the filter structure with several resonators also improves the out of hand rejection ratio of the structure, which deteriorates for large coupling levels.

It should be understood that a multiple-resonator structure would exhibit insertion loss higher than that of a single-resonator structure with the same resonator parameters, but not necessarily higher than the insertion loss of a structure comprised of less resonators with larger FSR and lower coupling level.

There is thus provided according to one aspect of the invention, an optical filter structure comprising an input waveguide, an output waveguide, and a filter stage formed by at least one closed loop resonator optically coupled to the input and output waveguides, wherein a level of the coupling from each of the waveguides to the resonator is at least 5 times greater than a loss-per-revolution of the resonator.

Preferably, said at least one resonator and the waveguides are made of at least one dielectric material with a refractive index different from a refractive index of a surrounding medium.

A reasonable narrow bandwidth filter for DWDM communication systems requires out of band rejection ratio of at least 30 dB, minimal insertion loss and an appropriate bandwidth. The bandwidth depends on the data rate, for example, a data rate of 10 GBs requires a bandwidth of approximately 20 GHz. These parameters depend on the architecture of the filter structure.

The filter structure of the present invention may comprise the single closed loop resonator having a free spectral range of about 200–1000 GHz.

Preferably, the filter structure comprises more than one closed loop resonator, which are optically coupled to each other. The closed loop resonators may be arranged in a serial-cascaded relationship between the input and output waveguides and be directly optically coupled to each other. The closed loop resonators may be arranged in a spaced-apart relationship between the input and output waveguides, each of the resonators being optically coupled to said waveguides, and the resonators being optically coupled to each other via segments of said waveguides between the resonators, thereby forming a compound closed loop resonator. The closed loop resonators may be arranged in a serial-cascaded relationship and be optically coupled to each other via an additional waveguide, such that the resonators at opposite sides of the additional waveguides form first and second filter stages, respectively. Various combinations of these configurations are possible.

In the multiple-resonator structure, the resonators may have the same or different free spectral ranges, wherein a free spectral range of the resonator is preferably about 200–1000 GHz. Each of the resonators may be wavelength tunable at least across its own free spectral range. Preferably, a ratio between the largest free spectral range and a bandwidth of the entire filter structure substantially does not exceed 30. The coupling level between the waveguides and the resonators is preferably higher than 12%.

According to another broad aspect of the present invention, there is provided a tunable optical filter structure comprising at least two waveguides and at least two closed loop resonator optically coupled to the waveguides and to each other, wherein a level of the coupling from the waveguides to the resonator is at least 5 times greater than, a loss-per-revolution of the resonator.

According to yet another broad aspect of the present invention, there is provided a method for reducing a bandwidth and insertion loss while filtering at least one optical channel from a multi-channel light signal, the method comprising inputting the light signal into an input waveguide of an optical filter structure that comprises at least one closed loop resonator optically coupled to said input waveguide and at least one output waveguide with a level of the coupling from the waveguides to the resonator being at least 5 times greater than a loss-per-revolution of the resonator.

The present invention according to its yet another aspect provides a method for reducing a bandwidth and insertion loss while filtering at least one optical channel from a multi-channel light signal, the method comprising inputting the light signal into an input waveguide of an optical filter structure that comprises at least two closed loop resonators optically coupled to said input waveguide and at least one output waveguide and to each other, a level of the coupling from the waveguides to the resonator being at least 5 times greater than a loss-per-revolution of the resonator.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1A:
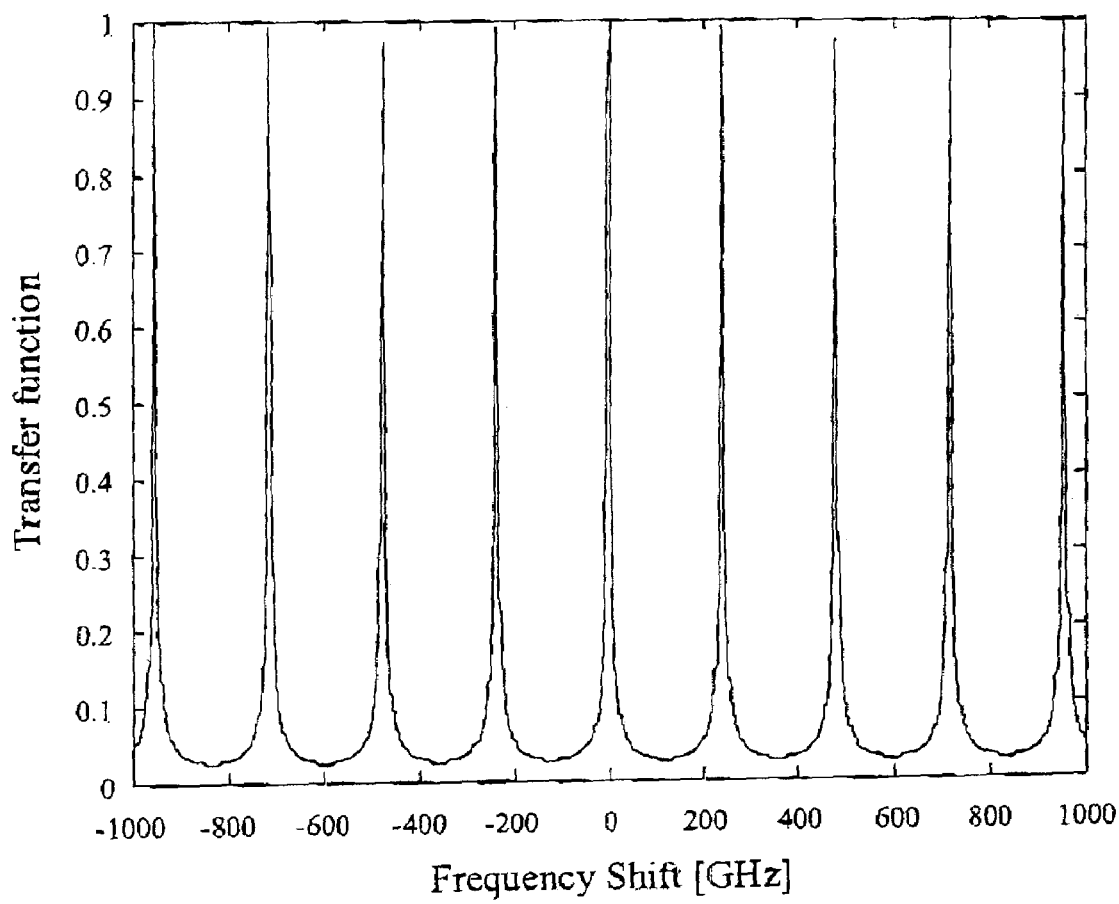
FIG. 1A illustrates the spectral response of a filter device utilizing a resonator coupled to an input and output ports.
Figure 1B:
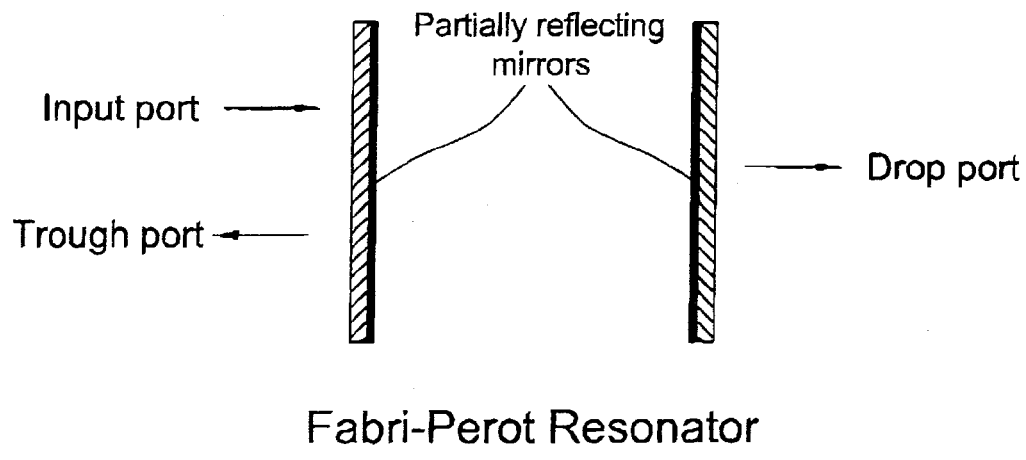
FIG. 1B exemplifies the implementation, of a resonator-based filter device utilizing a Fabry-Perot (FP) resonator.
Figure 1C:
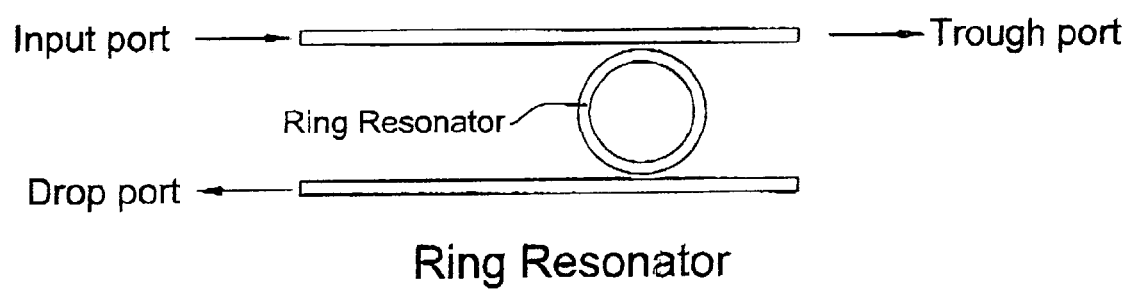
FIG. 1C exemplifies a single resonator based filter structure, that is suitable for realizing the principles of the present invention.

FIG. 1A illustrates the spectral response of a filter structure utilizing a resonator coupled to an input and output ports. FIG. 1B exemplifies the implementation of the resonator-based filter structure utilizing a Fabry-Perot resonator comprised of a pair of partially reflecting mirrors. FIG. 1C illustrates a filter structure utilizing a single closed-loop resonator coupled to two waveguides which serve as input/output ports.

As indicated above, a reasonable narrow bandwidth filter for DWDM communication systems requires out of band rejection ratio of at least 30 dB, minimal insertion loss and an appropriate bandwidth. These parameters depend on the architecture of the filter structure.

Turning back to FIG. 1C, this filter structure can be configured in accordance with the principles of the present invention, namely, the closed loop resonator can be selected with a relatively small FSR (but not less than the spectral band in which the filter is operating), and the coupling level from the input/output waveguides to the resonator is at least 5 times greater than the loss-per-revolution of the resonator. The resonator and the waveguides are preferably made of a dielectric material with refractive index n different from the refractive index of surrounding media.

Figure 2:
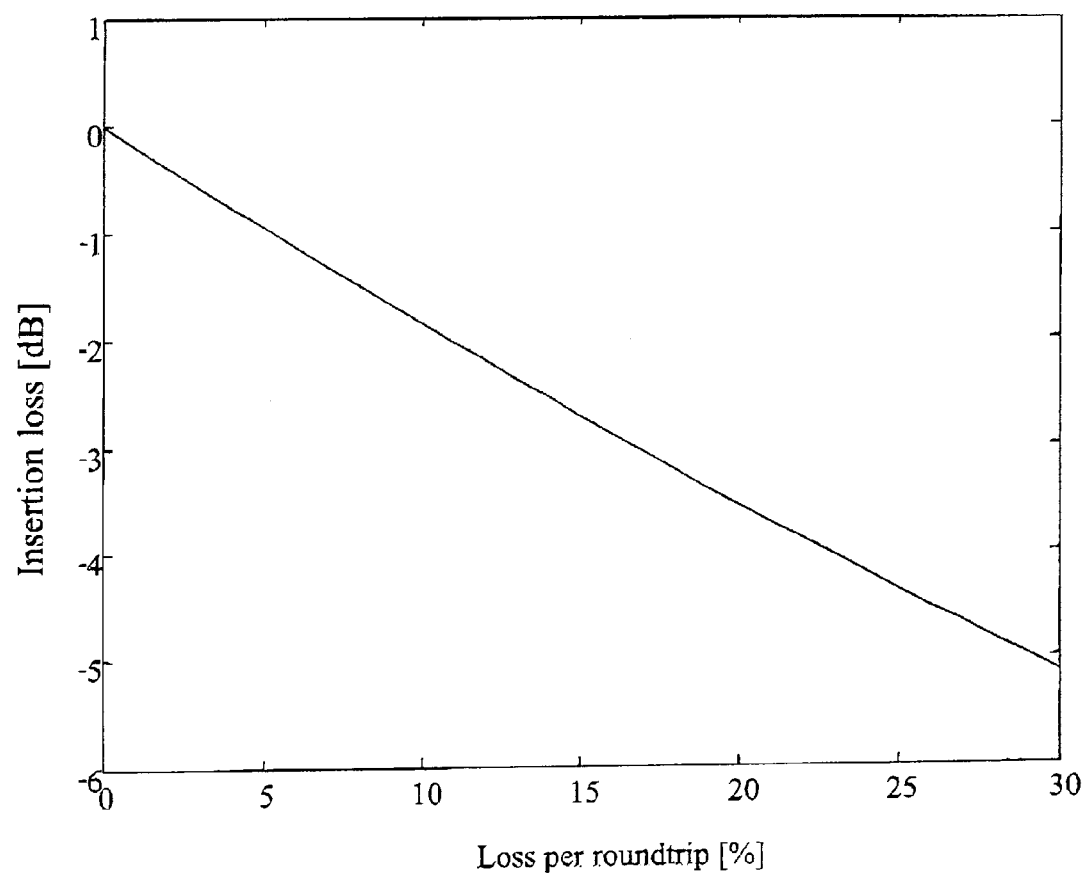
FIG. 2 exemplifies the insertion loss as a function of loss per roundtrip, for the filter structure of FIG. 1C with a 20% coupling coefficient and loss per roundtrip varying between 2% and 30%.

FIG. 2 exemplifies the insertion loss as a function of loss per roundtrip for a single ring-resonator based filter structure with a 20% coupling coefficient and loss per roundtrip varying between 2% and 30%. As shown, the input to output insertion loss of the filter structure decreases with the increase in the loss per rounding.

To solve the small FSR problem, a filter structure can be formed by several resonators with different FSRs (Vernier effect). The following are some more examples of a multi-resonator filter structure architecture utilizing the principles of the present invention.

Figure 3A:
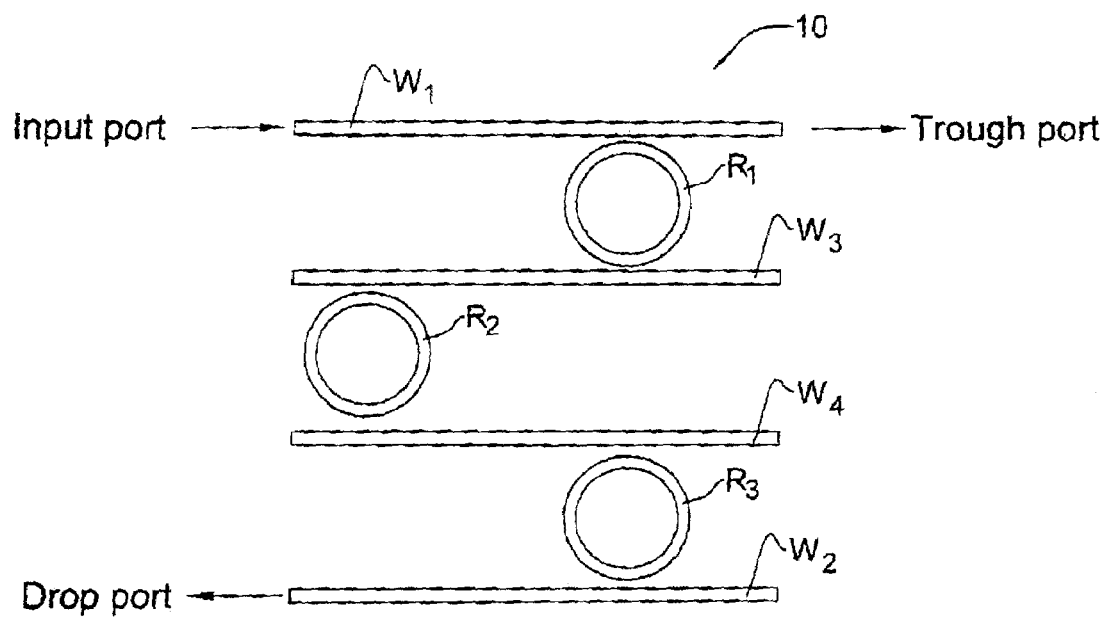
FIG. 3A exemplifies a multi-stage filter structure suitable for realizing the principles of the present invention.

FIG. 3A illustrates a filter structure 10 utilizing an input/throughput waveguide $W_1$, a drop waveguide $W_2$, intermediate waveguides $W_3$ and $W_4$, and serially cascaded closed loop (ring) resonators $R_1$, $R_2$ and $R_3$ coupled to each other indirectly, via the intermediate waveguides $W_3$ and $W_4$ between them. The resonators and the waveguides are made of dielectric material(s) with refractive index or indices different from the refractive index of surrounding media. The resonators $R_1$, $R_2$ and $R_3$ have either identical or different FSRs. Each of the resonators can be tuned at least across its own FSR. The ratio between the largest FSR and the bandwidth is preferably lower than 30. The coupling level between the input/output waveguides and the resonators is at least 5 times greater than the loss-per-revolution of the resonator, and is preferably higher than 12%.

Figure 3B:
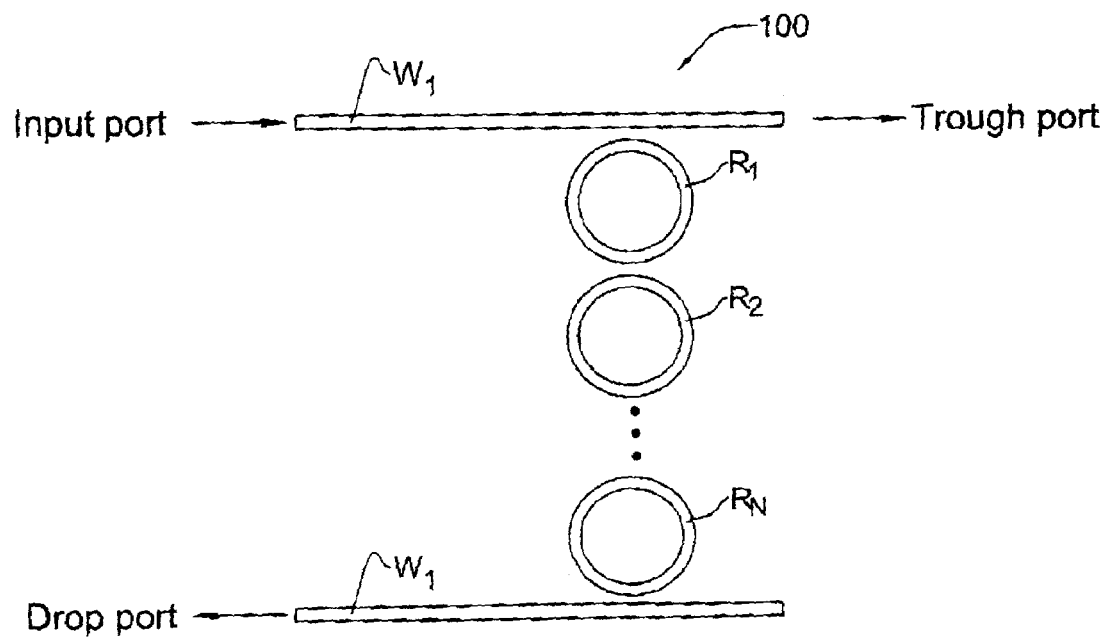
FIG. 3B illustrates yet another example of filter structure suitable for realizing the principles of the present invention, in the form of a single-stage multi-resonator structure where the resonators are directly optically coupled to each other.

FIG. 3B illustrates a filter structure 100 utilizing an input/throughput waveguide $W_1$, a drop waveguide $W_2$, and closed loop resonators $R_1$, $R_2$, . . . , $R_N$ serially cascaded between these waveguides and directly coupled to each other. Similarly to the previous sample, as well to all other examples described below, the resonators and the waveguides are preferably made of dielectric material(s) with refractive index or indices different from that of surrounding media; the resonators have either identical or different FSRs; each of the resonators can be tuned at least across its own FSR. The preferred conditions in this example, as well as in all the other multiple-resonator structures described below, is that the ratio between the largest FSR and the bandwidth of the filter structure is lower than 30, and/or the coupling level between the input/output waveguides and the resonators is at least 5 times greater than the loss-per-revolution of the resonator, and is preferably higher than 12%.

Figure 3C:
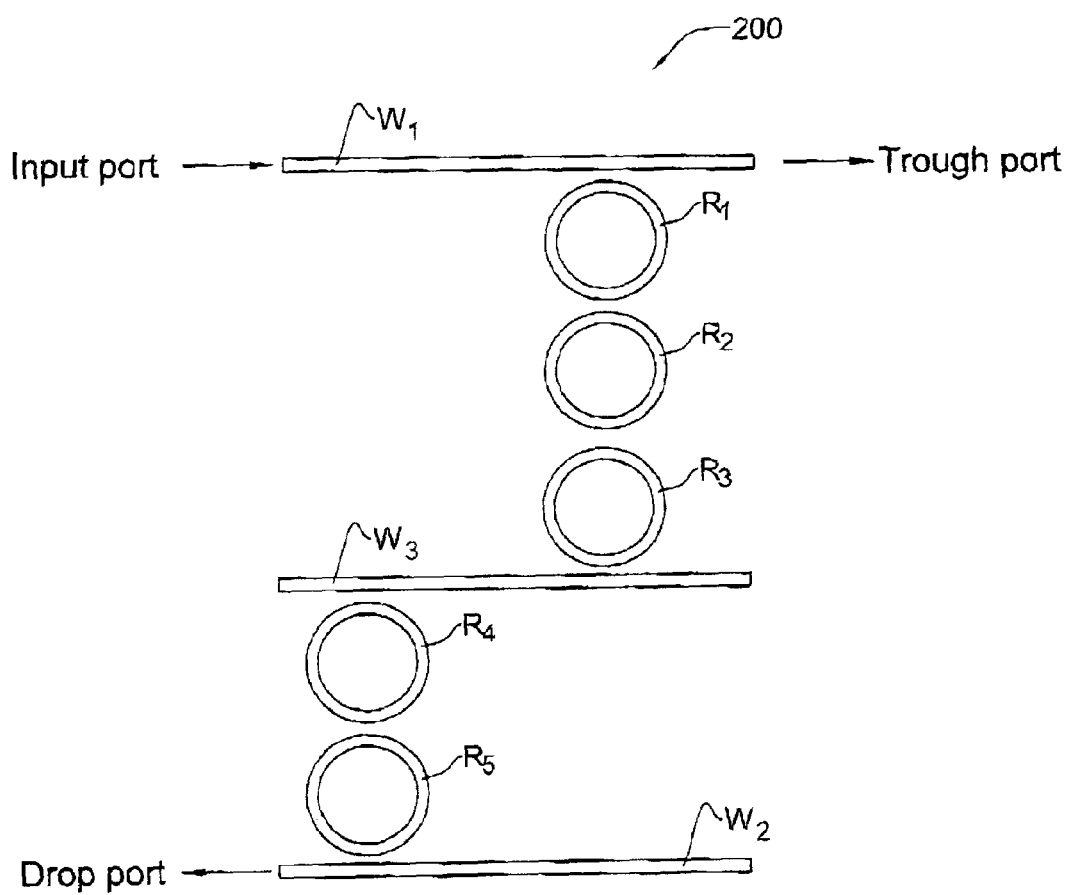
FIG. 3C schematically illustrates an example of a filter structure suitable for realizing the principles of the present invention, in the form of double-stage multiple-resonator structure where the resonators of each stage are directly optically coupled to each other and the two stages are coupled to each other via an intermediate waveguide.

FIG. 3C illustrates a filter structure 200 including multiple stages (two such stages I and II being shown in the figure) associated with input/throughout and drop (output) waveguides $W_1$ and $W_2$ and at least one intermediate waveguide—one such waveguide $W_3$ being used in the two-stage structure of the present example. In the present example, each stage is designed as the filter structure of FIG. 3B, and the two stages are optically coupled to each other via the intermediate waveguide $W_3$. The filter stage I is composed of serially cascaded directly coupled ring resonators $R_1$, $R_2$, $R_3$ (generally n such resonators), and the filter stage II is composed of serially cascaded directly coupled ring resonators $R_4$ and $R_5$ (generally m such resonators, wherein m may and may not be equal to n). The ring resonators $R_3$ and $R_4$ are coupled to each other via the intermediate waveguide $W_3$.

Figure 4A:
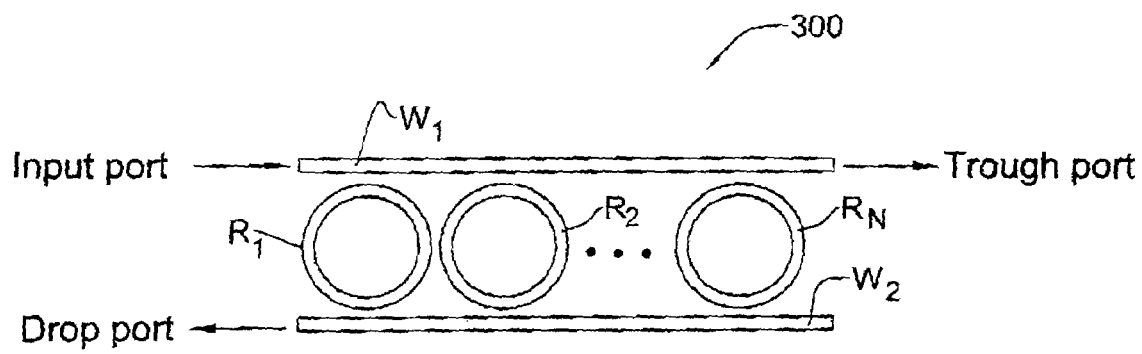
FIG. 4A exemplifies a single-stage compound resonator structure suitable for realizing the principles of the present invention.

In the above examples, the serial-cascaded arrangement of ring resonators is used. FIG. 4A illustrates a filter structure 300 formed by input/throughput and drop waveguides $W_1$ and $W_2$, and closed loop resonators $R_1$–$R_N$ arranged in a parallel-cascaded manner. The resonators $R_1$–$R_N$ are arranged in a spaced apart relationship between the waveguides $W_1$ and $W_2$, each resonator being optically coupled to the waveguides $W_1$ and $W_2$, and each two locally adjacent resonators being coupled to each other via linear segments of the waveguides $W_1$ and $W_2$ between these resonators. This is the so-called "closed loop compound resonator" for storing optical energy of a predetermined frequency range, disclosed in WO 01/27692 assigned to the assignee of the present application.

Figure 4B:
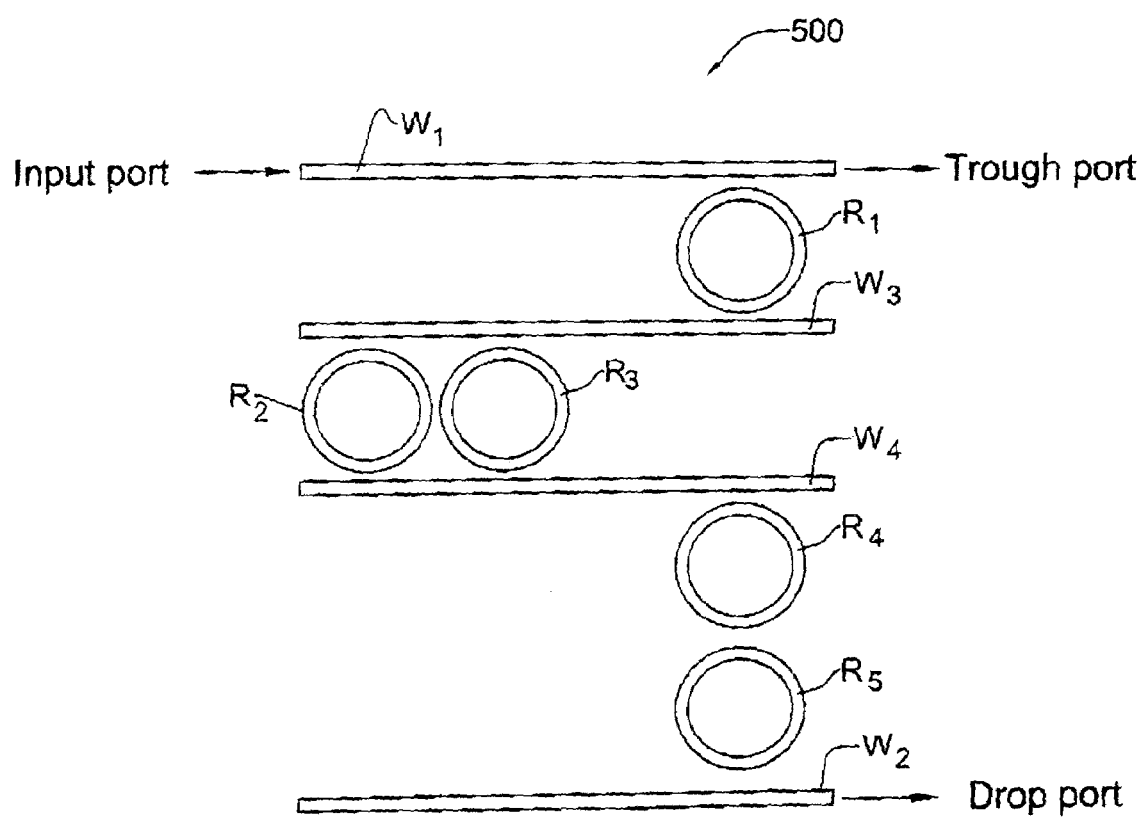
FIG. 4B illustrates one more example of a filter structure suitable for realizing the principles of the present invention, where a combination of parallel and serial-cascaded arrangements of the resonators is used.

FIG. 4B exemplifies a filter structure 500 utilizing combinations of the serial and parallel approaches of arranging the closed loop resonators. Here, a ring resonator $R_1$ is accommodated between and optically coupled to an input/throughput waveguide $W_1$ and an intermediate waveguide $W_3$, ring resonators $R_2$ and $R_3$ are arranged in a spaced-apart parallel relationship between and optically coupled to the waveguides $W_3$ and a further intermediate waveguide $W_4$, and ring resonators $R_4$ and $R_5$ are directly coupled to each other and arranged in a serial-cascaded relationship between the waveguide $W_4$ and a drop waveguide $W_5$.

In all the above examples, the mechanisms influencing the insertion loss and the bandwidth are essentially the same. The correct method to compare between the filter architectures is to introduce a set of requirements such as bandwidth and rejection ratio, and compare the insertion loss of the various designs with different FSRs and coupling levels, which meet the set of requirements.

Figure 5A:
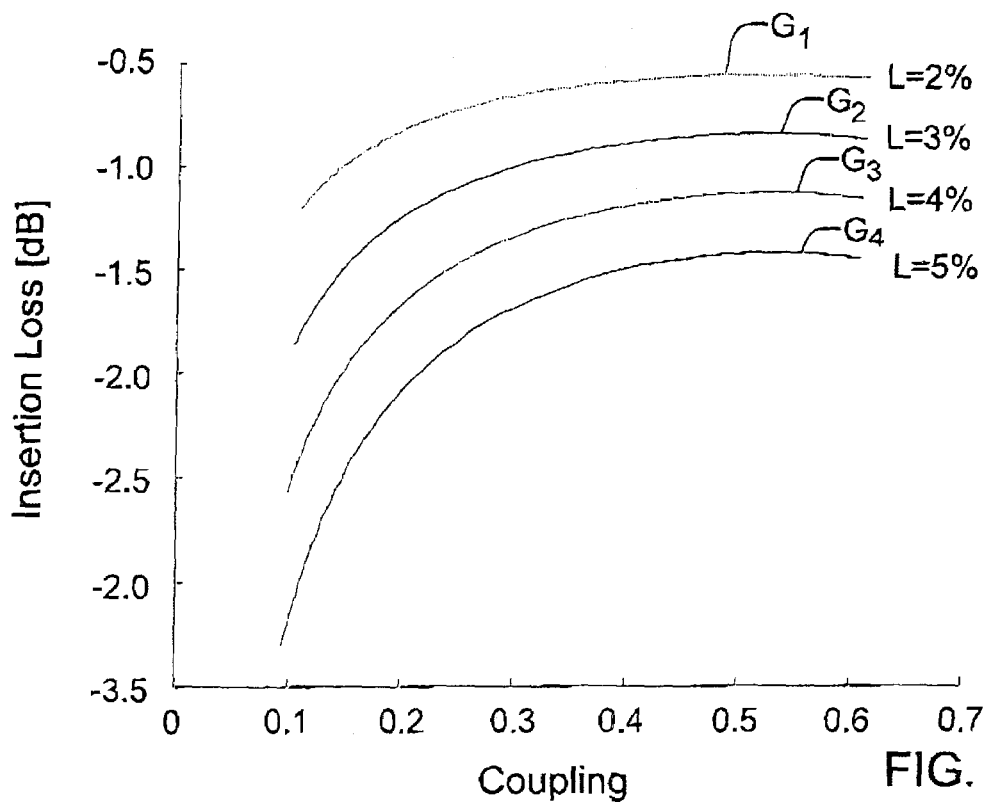
FIGS. 5A and 5B illustrate, respectively, the insertion loss as a function of the coupling coefficient, and the insertion loss as a function of the ratio between the FSR and a required bandwidth, for the filter structure of FIG. 3A.
Figure 5B:
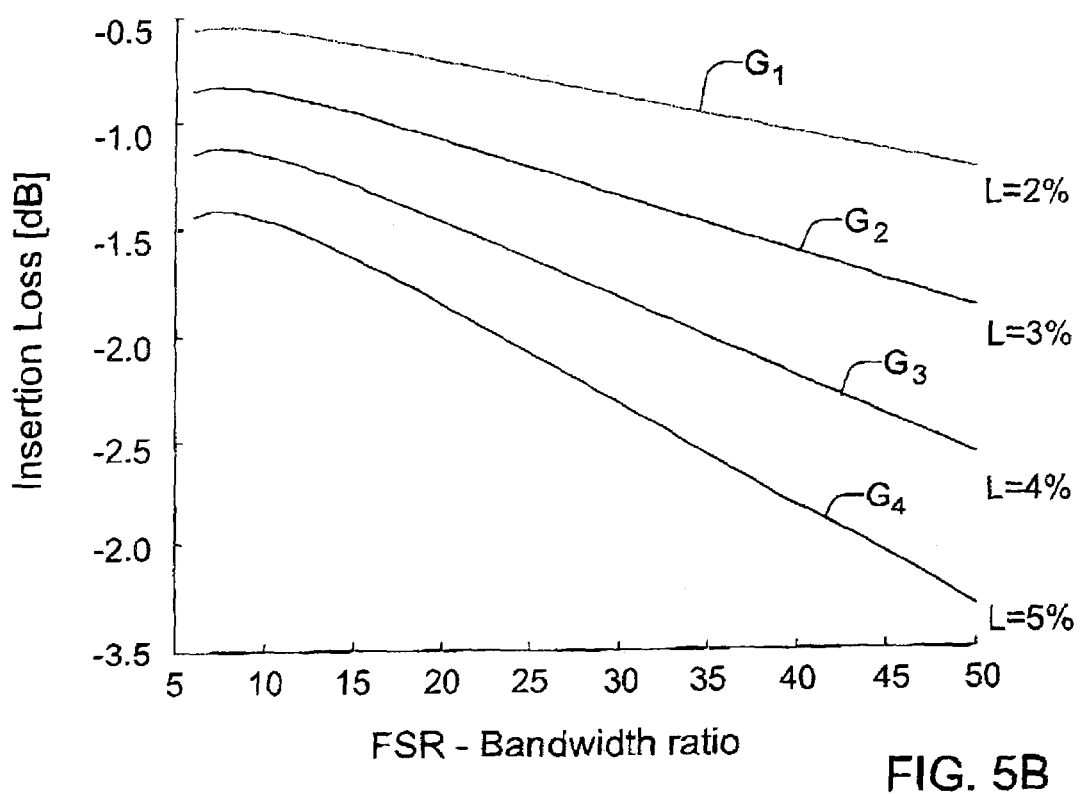

FIGS. 5A and 5B illustrate, respectively, the insertion loss as a function of the coupling coefficient, and the insertion loss as a function of the ratio between the FSR and a required bandwidth, for indirectly coupled ring resonators, as exemplified in FIG. 3A. Four graphs $G_1$–$G_4$ are shown corresponding to the loss per roundtrip levels L of, respectively, 2%, 3%, 4% and 5%. The required out of band rejection ratio used to generate these graphs was 30 dB.

The FWHM and the out of band rejection ratio (RR) in dB of a single closed loop resonator is given by:

$$FWHM = \frac{FSR}{\pi} \cos^{-1}\left[1 - \frac{(1-x)^2}{2x}\right]; x = (1-k) \cdot \alpha$$

$$RR = 10 \cdot \log_{10}\left(\frac{1+x}{1-x}\right)^2$$

where k is the coupling coefficient and $\alpha = \sqrt{1-L}$, where L is the loss per roundtrip in the resonator.

The insertion loss (IL) of a single ring resonator is given by:

$$IL = 10 \cdot \log_{10}\left[\frac{\alpha \cdot k^2}{(1-x)^2}\right]$$

The insertion loss IL and out of band rejection ratio RR of serially cascaded resonators, which are indirectly coupled, can be found by summing over the IL and RR (in dB) of all the resonators.

As can be seen in graphs $G_1$–$G_4$ of FIGS. 5A–5B, the insertion loss decreases for higher coupling level and smaller FSR (keeping the required bandwidth constant). Because of the higher coupling levels, more resonators are needed in the filter structure, in order to maintain the same level of out of band rejection ratio. For example, in order to achieve insertion loss smaller that 2.5 dB, the coupling level is to be larger than about 14%, and the FSR (largest) is to be smaller than approximately 30 times the required bandwidth. Although the insertion loss continues to decrease as the coupling level is increased, for coupling levels higher than 35–40%, the improvement in the insertion loss becomes negligible.

The reason for the improvement in the insertion loss is associated with the relation between the coupling coefficient and the loss per revolution in the resonators. The insertion loss increases with higher loss per revolution, decreases with higher coupling levels, and is independent of the FSR. Nevertheless, in order to maintain the filter bandwidth while decreasing the FSR, higher coupling levels are needed. In addition, the loss per revolution generally decreases for smaller FSR, and as a result the insertion loss improves. According to the dependencies in FIG. 5A, in order to achieve low insertion loss (for example less than 1.5 dB), the coupling should be at least 5 times larger than the loss per revolution. The required ratio even increases for higher-loss-per revolution levels.

Figure 6A:
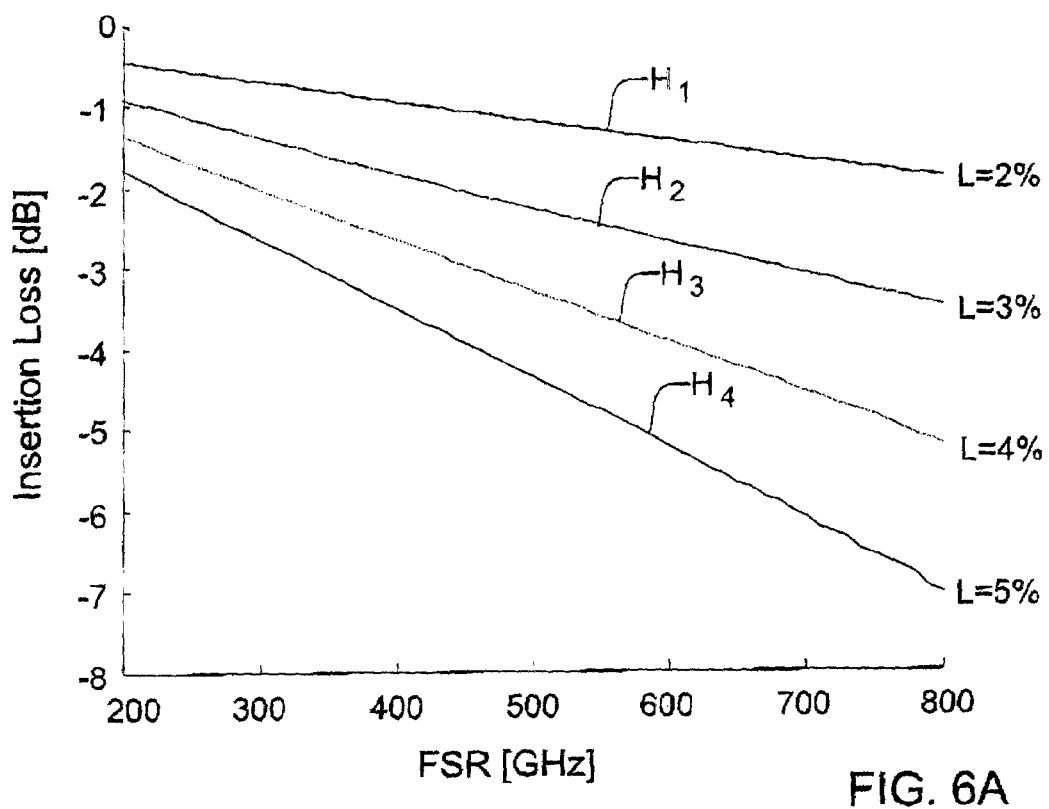
FIGS. 6A and 6B illustrate the insertion loss and the rejection ratio as a function of FSR for the filter structure generally similar to that of FIG. 3B.
Figure 7A:
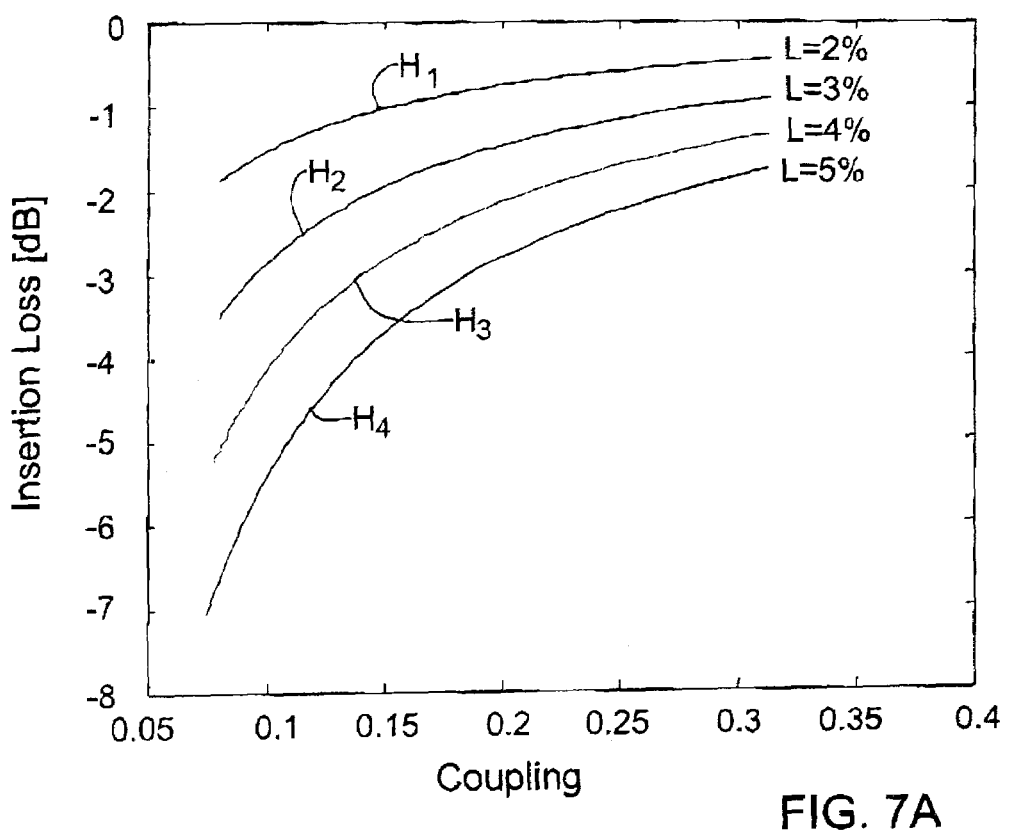
FIGS. 7A and 7B illustrate the insertion loss and the rejection ratio as a function of the (external) coupling level, for the filter structure generally similar to that of FIG. 3B.
Figure 7B:
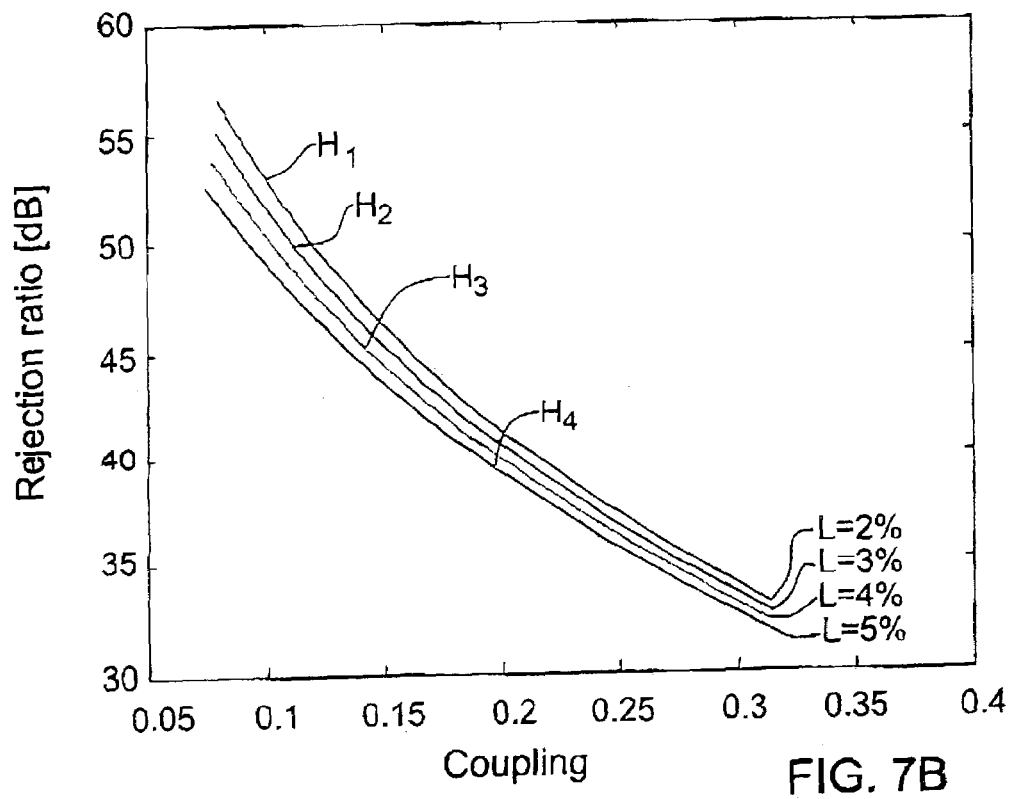

Reference is now made to FIGS. 6A and 6D showing the insertion loss and the rejection ratio as a function of FSR, and FIGS. 7A and 7B showing the insertion loss and the rejection ratio as a function of the (external) coupling level. Each of these figures includes four graphs $H_1$–$H_4$ corresponding to the loss per roundtrip levels L of 2%, 3%, 4% and 5%, respectively, in a filter structure generally similar to that of FIG. 3B, including two directly coupled serially cascaded ring resonators, for a FWHM of approximately 20 GHz. The drop function of such a structure is given by:

$$D = \frac{-k_{ext}\sqrt{k_{in} \cdot (1-L)} \cdot \exp\left(j\frac{\varphi_1 + \varphi_2}{2}\right)}{1 - \sqrt{(1-k_{ext})(1-L)} \cdot \left\{\sqrt{(1-k_{in})}\exp(j\varphi_2) - \exp(j\varphi_1) \cdot \left[\sqrt{(1-k_{in})} - \sqrt{(1-k_{ext})}\exp(j\varphi_2)\right]\right\}}$$

where $k_{in}$ and $k_{ext}$ are the waveguide-resonator and resonator-resonator coupling coefficients, respectively; and $\phi_{1,2} = 2\pi f/FSR_{1,2}$, where $FSR_{1,2}$ is the FSR of the first and second resonators, respectively.

Figure 6B:
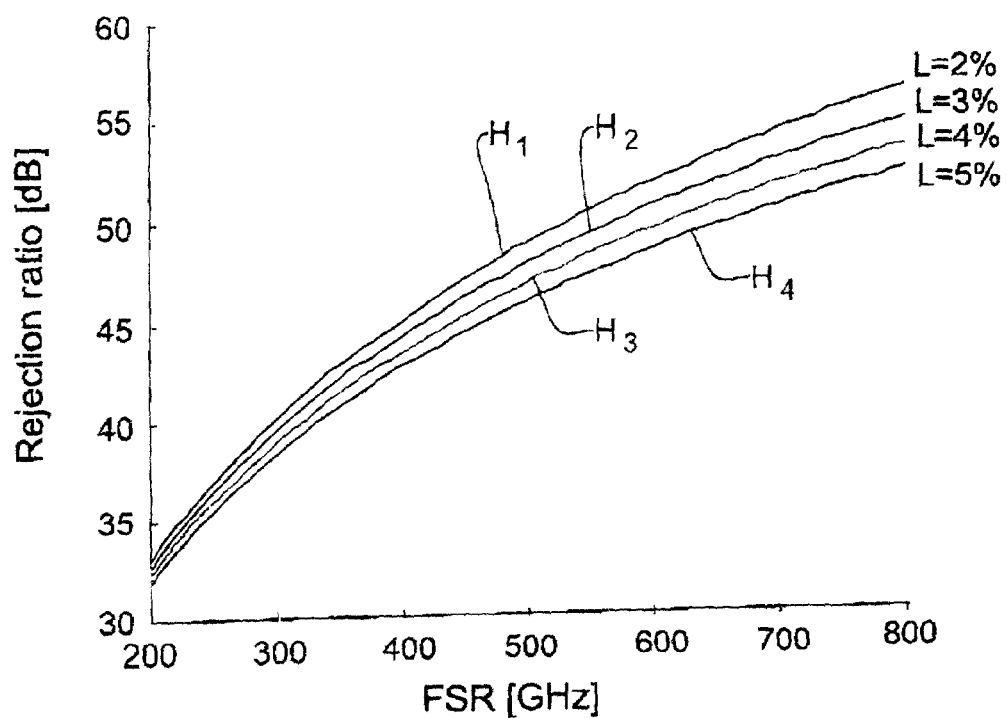

As for the previous structure (shown in FIG. 3B), the insertion loss decreases as the coupling level and FSR increase. In order to achieve a reasonable level of the insertion loss, for example, lower an 3 dB, the resonator-waveguide coupling level should be higher than about 12% (FIG. 7A), and the FSR is smaller than about 600 GHz (which means that the FSR to bandwidth ratio is smaller than 30 as shown in FIG. 7B). On the other hand, increasing the coupling levels above 35% (FIG. 6A) and decreasing the FSR below 200 GHz, yields a poor out of band rejection ratio (less than 30 dB—FIG. 6B).

The reason for the above is the same as that for the indirectly coupled resonators architecture, namely, increasing the coupling to loss-per-revolution ratio results in a decrease of the insertion loss. Similarly, in order to achieve low insertion loss (for example less than 1.5 dB), the coupling should be at least 5 times larger than the loss per revolution (FIG. 7A).

For both configurations (directly and indirectly coupled serially cascaded resonators), it appears that good insertion loss (sufficiently low) and out of band rejection ratio (sufficiently high) can be achieved, if the coupling levels are at least 5 times greater than the loss-per-revolution, (approximately 10% for 2% loss-per-revolution) and the FSR to bandwidth ratio is decreased approximately below 30.

In the above-described filter structures (FIGS. 3A–3C and 4A–4B), a resonator-based filter structure can be easily tuned in wavelength by changing the refractive index of each resonator and by that, changing its resonance frequencies. The change of the refractive index can be achieved by various methods such as heating the resonator (thermo-optic effect), subjecting it to electric field (electro-optic effect), mechanical pressure, free carrier injection change of refractive index, piezo electric effect, etc.

The utilization of several resonators with small and different FSRs (Vernier effect) instead of resonators with large FSR also introduces improvement in the tuning characteristics of the device. The tuning range of the device depends on the maximal shift in the resonator resonance frequency that can be induced by changing its refractive index. This shift is given by:

$$\Delta f = \frac{f}{n_{eff}} \Delta n_{eff}$$

wherein f is the resonance frequency, $n_{eff}$ is the effective index and d is the $\Delta n_{eff}$ is the induced change in the effective index which is approximately equal to the change in the resonator refractive index.

It is important to understand that the maximal resonance shift depends mainly on the material properties and that the influence of the resonator structure on this effect is practically negligible.

Figure 8:
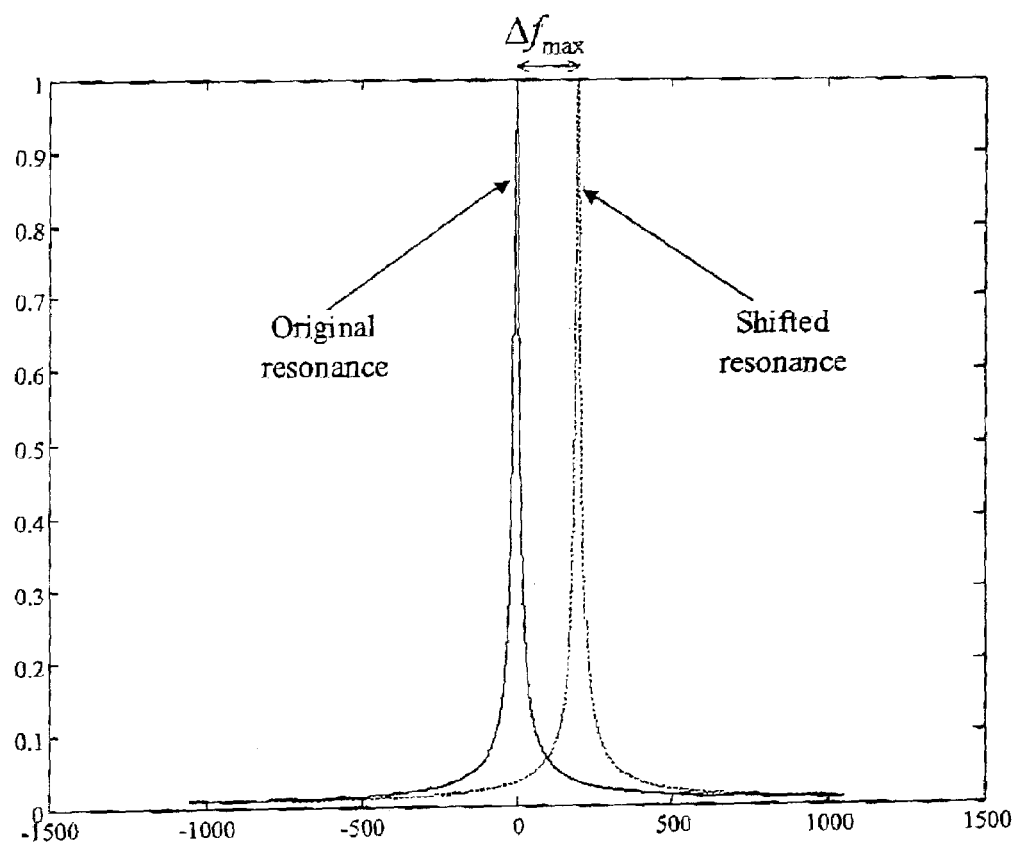
FIG. 8 illustrates the technique of turning the frequency response of a high-FSR resonator-based filter structure.

If the device is comprised of resonators with high FSR (for example, small rings), the possible tuning is defined by the possible shift $\Delta f$ of the resonance frequency of the resonator. FIG. 8 illustrates the timing of the frequency response (transfer function) of a high-FSR resonator-based filter structure. If, however, the FSRs of the multiple resonators are different and relatively small, the transmission peak of the device can be shifted substantially more than each resonator tuning range. If each resonator can be tuned across its own FSR, the device tuning range is practically unlimited.

Figure 9A:
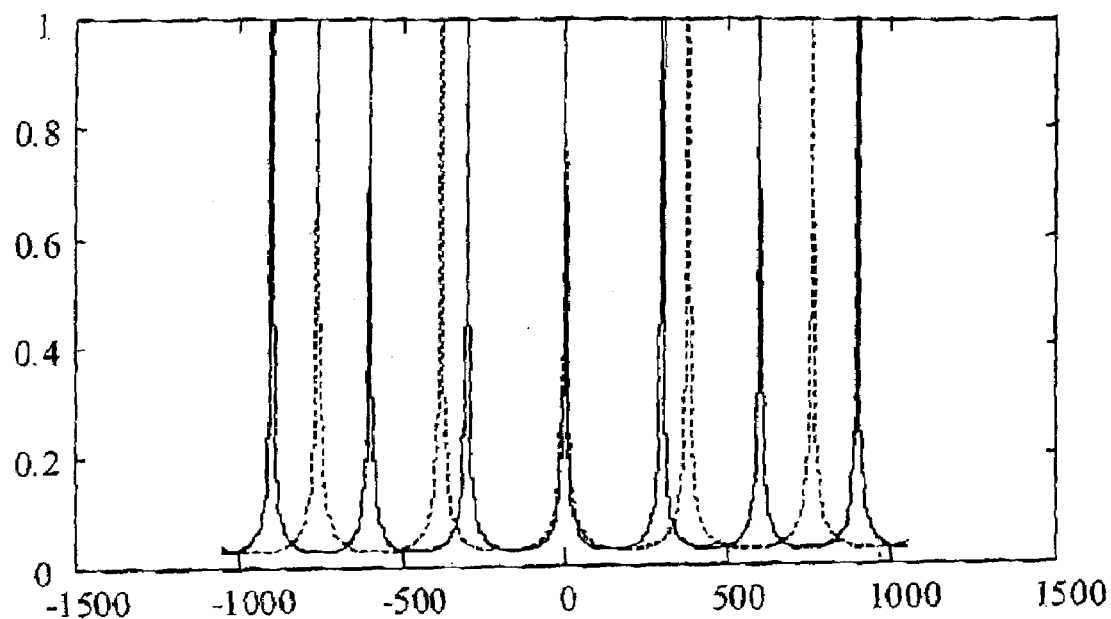
FIGS. 9A–9B and 10A–10B illustrate the enhanced capabilities of a two-resonator based filter structure of FIG. 3B.
Figure 9B:
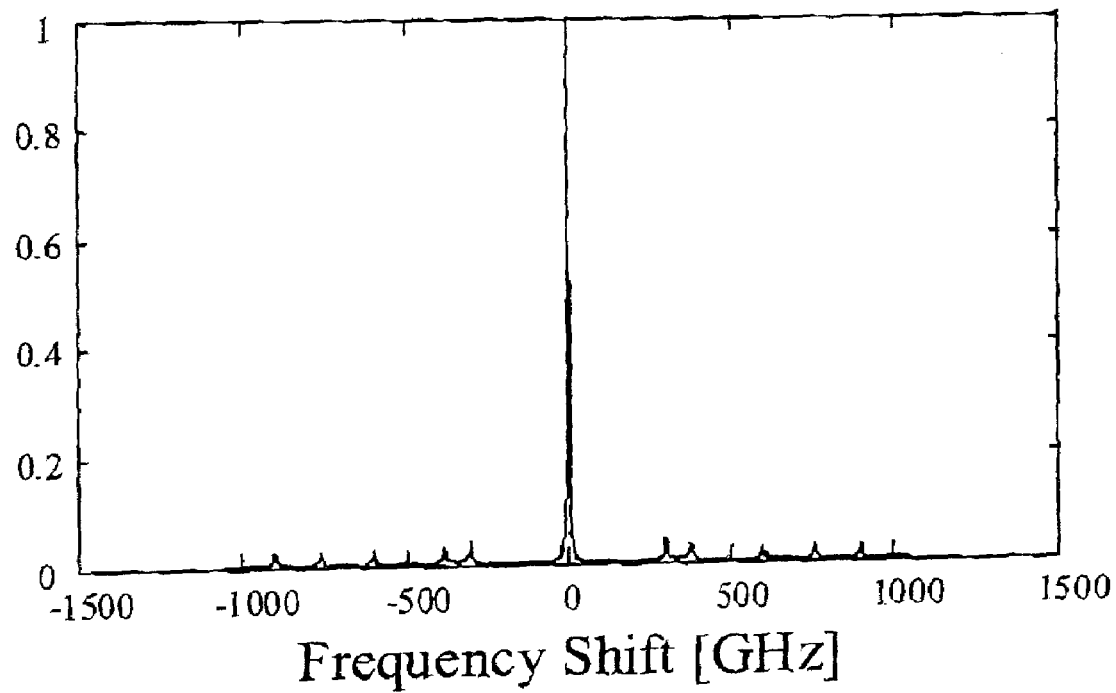
Figure 10A:
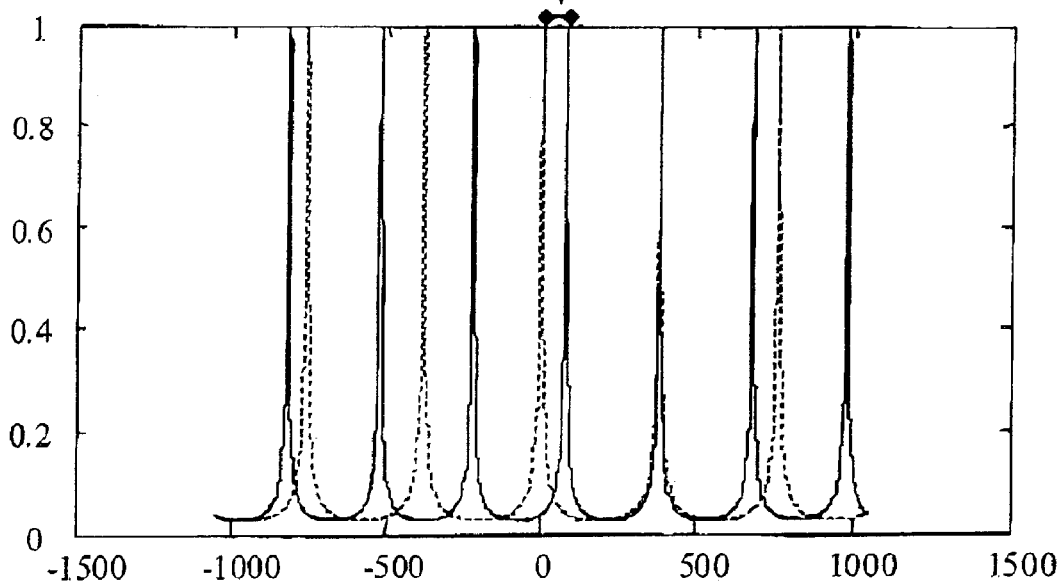
Figure 10B:
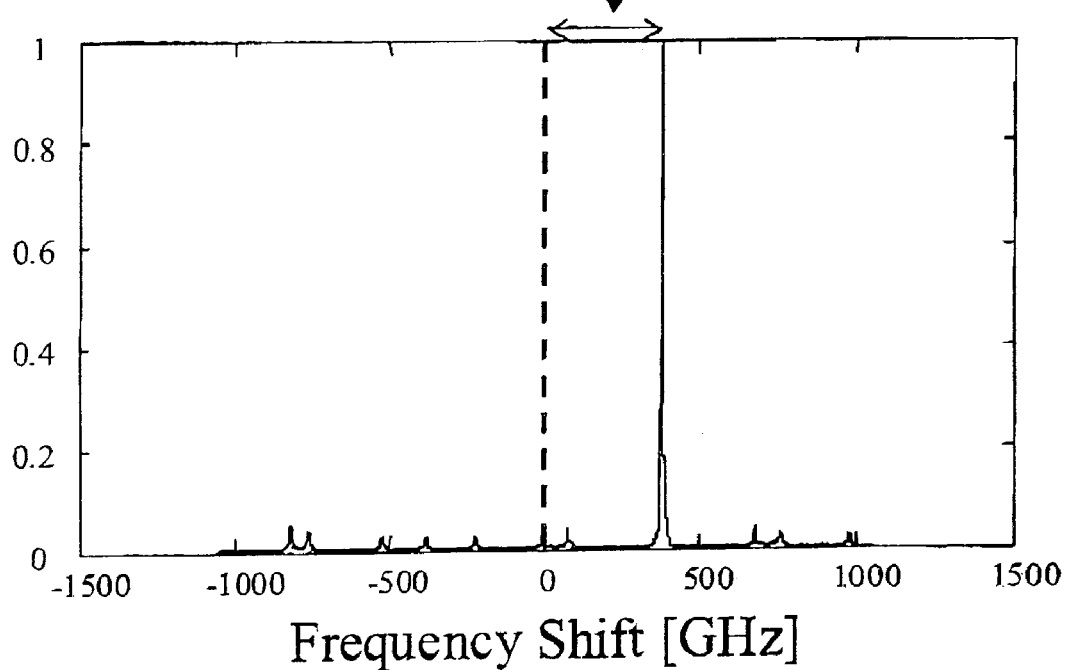

FIGS. 9A–9B and 10A–10B illustrate the enhanced tuning capabilities of a two-resonator based filter structure (as that shown in FIG. 3B, namely including two directly coupled serially cascaded ring resonators), where the maximal FSR of the resonator is smaller than the maximal possible resonance shift denoted by $\Delta f_{max}$. FIGS. 9A–9B illustrate a situation where no resonance shift is applied on the resonators, FIG. 9A showing the resonance frequencies of the first (curve $H_1$) and second (curve $H_2$) resonators, and FIG. 9B showing the complete transfer function. FIGS. 10A–10B illustrate a situation where the first resonator (curve $H_1$) is shifted by 0.4 $\Delta f_{max}$ and, as a result the transmission peak is shifted by 1.84$\Delta f_{max}$. This demon strates another benefit of using small FSR resonators, consisting in a substantial increase in the capability to tune the filter structure in wavelength.

The filter structure according to the present invention may be used in several key devices in WDM systems. The low loss and high extinction ratio are important factors in providing optical monitoring functionality of the information channels. In this case, the filter structure of the present invention provides for scanning across the band of channels and monitoring the power and frequency of each channel, as well as the noise between the channels. For accurate readings, a high out of band extinction ratio is critical. Another possible application for the filter structure of the present invention is in an optical receiver. The filter structure can be used to isolate a given channel to be detected from a multitude of other channels and optical noise. The technique of the present invention provides for optimizing such critical parameters of this filter structure as the out of band extinction ratio and the filter width and filter insertion loss.

Those skilled in the art will readily appreciate that various modifications and changes can be applied to the embodiments of the invention as hereinbefore exemplified without departing from its scope defined in and by the appended claims.

The invention claimed is:

1. A method for reducing a bandwidth and insertion loss while filtering at least one optical channel from a multichannel light signal, the method comprising passing the light signal through an input waveguide of an optical filter structure, that comprises at least two closed loop resonators optically coupled to said input waveguide and at least one output waveguide and to each other, wherein a level of the coupling from the waveguide to the resonator is at least 5 times greater than a loss-per-revolution of the resonator and a ratio between the largest free spectral range and a bandwidth of the filter structure substantially does not exceed 30.

2. The method according to claim 1, wherein the coupling level between the waveguides and resonators is higher than 12%.

3. The method according to claim 1, comprising selecting a number of the closed-loop resonators and the level of coupling in accordance with a required bandwidth of the optical filter structure.

4. The method according to claim 3, wherein the required bandwidth of the optical filter structure is provided by using either a smaller number of the closed-loop resonators with a lower level of said coupling, or a larger number of the closed-loop resonators with a higher level of said coupling.

* * * * *